United States Patent
Egeland

(10) Patent No.: US 12,343,637 B2
(45) Date of Patent: Jul. 1, 2025

(54) METHOD AND SYSTEM FOR PROVIDING GAME REIMMERSION

(71) Applicant: Sony Interactive Entertainment LLC, San Mateo, CA (US)

(72) Inventor: Katie Egeland, San Mateo, CA (US)

(73) Assignee: Sony Interactive Entertainment LLC

( * ) Notice: Subject to any disclaimer, the term of this patent is extended or adjusted under 35 U.S.C. 154(b) by 400 days.

(21) Appl. No.: 17/827,611

(22) Filed: May 27, 2022

(65) Prior Publication Data

US 2023/0398455 A1  Dec. 14, 2023

(51) Int. Cl.
*A63F 13/67* (2014.01)

(52) U.S. Cl.
CPC .................. *A63F 13/67* (2014.09)

(58) Field of Classification Search
CPC ....................................... A63F 13/67
See application file for complete search history.

(56) References Cited

U.S. PATENT DOCUMENTS

| | | | |
|---|---|---|---|
| 2006/0160591 A1* | 7/2006 | Kogo | A63F 13/30 463/1 |
| 2017/0259177 A1 | 9/2017 | Aghdaie et al. | |
| 2018/0361254 A1 | 12/2018 | Anderson | |
| 2021/0129031 A1 | 5/2021 | Eads et al. | |
| 2023/0182008 A1* | 6/2023 | Anthony | A63F 13/215 463/37 |

OTHER PUBLICATIONS

PCT Notification of Transmittal of the International Search Report & the Written Opinion of the International Searching Authority, issued in corresponding PCT/2023/022779, mailed Aug. 10, 2023 (13 total pages).

* cited by examiner

*Primary Examiner* — Thomas H Henry
(74) *Attorney, Agent, or Firm* — Kilpatrick Townsend & Stockton LLP

(57) ABSTRACT

A method for adjusting game intensity for reimmersion into gameplay of a user includes identifying a gap in time between a prior session of gameplay and a current session of gameplay of the user, and applying an intensity adjustment for the gameplay of the current session. The intensity adjustment is configured to reduce a level of interactive input required to advance in the game. The method also includes monitoring a success of the interactive input of the user during the current session, and removing the applied intensity adjustment gradually as the success of the interactive input approaches a level achieved in the prior session.

19 Claims, 8 Drawing Sheets

METHOD AND SYSTEM FOR PROVIDING GAME REIMMERSION

BACKGROUND

During gameplay sessions, users tend to become immersed in gameplay and the user's skills can increase as the result of familiarity with the game as well as more focused concentration during the immersive gameplay. In some games, the input combinations are complex and require not only skill but also memory as to which controller buttons should be pushed or what game mechanics should be played in particular contexts. Unfortunately, if a user stops a session and does not return to the game for a while, the user might forget the point in the game at which the user last played or forget the controller inputs needed to restart gaming at the point in the game at which the user last played. As a result, the user might be reluctant to return to the game. If the user does return to the game, the user's diminished knowledge of the game can cause the user's skill level to decline significantly. This can cause the user to become frustrated and quit playing the game.

It is in this context that embodiments arise.

SUMMARY

In an example embodiment, a method for adjusting game intensity for reimmersion into gameplay of a user is provided. The method includes identifying a gap in time between a prior session of gameplay and a current session of gameplay of the user, and applying an intensity adjustment for the gameplay of the current session. The intensity adjustment is configured to reduce a level of interactive input required to advance in the game. The method also includes monitoring a success of the interactive input of the user during the current session, and removing the applied intensity adjustment gradually as the success of the interactive input approaches a level achieved in the prior session.

In one embodiment, the gap in time between the prior session and the current session is correlated to a predicted loss in skill by the user, and the reduction in the level of interactive input reduces a number of inputs via a controller to advance in the game. In one embodiment, when the gap in time is longer than about one month, the intensity adjustment is applied. In one embodiment, when the gap in time is greater than about twelve months, the intensity adjustment is maximized.

In one embodiment, the predicted loss in skill is based on machine learning processing that produces a user profile model, and the user profile model is used for the predictive loss in skill of the user over the gap in time. In one embodiment, the monitoring of the success of the interactive input of the user during the current session is used for gearing the removal of the applied intensity adjustment, with the gearing increasing a rate at which the intensity adjustment is gradually removed when the user achieves more success and the gearing decreasing the rate at which the intensity adjustment is gradually removed when the user achieves less success. In one embodiment, the success of the user is normalized to a median of success achieved by a predetermined number of other users in the game.

In one embodiment, the monitoring of the success of the interactive input of the user during the current session is used for gearing the removal of the applied intensity adjustment, with the gearing being the rate at which the intensity adjustment is gradually removed until the level of success of the interactive input of the user during the current session reaches the level of success achieved in the prior session. In one embodiment, the applying of the intensity adjustment for the gameplay of the current session is configured to enable advancement in the game with a lower skill level, with the lower skill level being correlated to the gap in time. In one embodiment, a larger gap in time influences a degree to which a skill level is lowered to arrive at the lower skill level.

In one embodiment, the method further includes generating a summary of the prior session, with the summary assisting the user to understand a context of the game when resuming gameplay in the current session. In one embodiment, the summary is one of a written summary providing a text description of events related to the prior session or a video summary showing highlights and key events that occurred in the prior session.

In one embodiment, the intensity adjustment for the gameplay of the current session additionally reduces an amount of interactive content displayed for scenes in the game, with the interactive content being game assets displayed in the scenes in the game. In one embodiment, the gap in time between the prior session and the current session is correlated to a predicted loss in skill by the user using a user profile model that characterizes skills of the user. In one embodiment, for the predicted loss in skill by the user, the applied intensity adjustment both reduces the level of interactive input by the user required to advance in the game and reduces an amount of interactive content displayed for scenes in the game.

In one embodiment, advancing in the game includes completing actions in the game, with each of the actions being associated with required interactive input by the user. In one embodiment, the required interactive input by the user includes inputs via a controller, with the inputs via the controller including button presses or combinations of button presses. In one embodiment, removal of the applied intensity adjustment is associated with a reimmersion of the user into the game, and the reimmersion of the user into the game corresponds to the interactive input of the user during the current session achieving a level of success that meets or exceeds the level of success achieved in the prior session.

In another example embodiment, a method for adjusting game intensity for reimmersion into gameplay of a user is provided. The method includes identifying a gap in time between a prior session of gameplay and a current session of gameplay of the user, and applying an intensity adjustment for the gameplay of the current session responsive to the user accepting an option for reimmersion assistance. The intensity adjustment is configured to reduce a level of interactive input required to advance in the game. The method also includes monitoring a success of the interactive input of the user during the current session, and removing the applied intensity adjustment gradually as the success of the interactive input approaches a level achieved in the prior session.

In one embodiment, the method further includes sending the option for reimmersion assistance to the user in a notification, with the notification providing an input that enables acceptance of the option by the user for gameplay of the game. In one embodiment, the notification is provided by a user interface presented in a display used for gameplay of the game, where the input is selectable using one of a button press of a controller used for gameplay or voice input.

In yet another example embodiment, a non-transitory computer readable medium containing program instructions for adjusting game intensity of a game for reimmersion into gameplay by a user is provided. The execution of the program instructions by one or more processors of a computer system causes the one or more processors to carry out operations of a method for adjusting game intensity of a game for reimmersion into gameplay by a user. The method operations include identifying a gap in time between a prior session of gameplay and a current session of gameplay of the user, and applying an intensity adjustment for the gameplay of the current session. The intensity adjustment is configured to reduce a level of interactive input required to advance in the game. The method operations also include monitoring a success of the interactive input of the user during the current session, and removing the applied intensity adjustment gradually as the success of the interactive input approaches a level achieved in the prior session.

Other aspects and advantages of the disclosures herein will become apparent from the following detailed description, taken in conjunction with the accompanying drawings, which illustrate by way of example the principles of the disclosures.

DETAILED DESCRIPTION

In the following description, numerous specific details are set forth in order to provide a thorough understanding of the example embodiments. However, it will be apparent to one skilled in the art that the example embodiments may be practiced without some of these specific details. In other instances, process operations and implementation details have not been described in detail, if already well known.

Embodiments of the present invention provide techniques for facilitating reimmersion of a user into a video game after the user has not played the game for a while. Many users are reluctant to resume playing a video game which the user has not played in a while due to a drop in skill level. In one example, a method for adjusting game intensity of a game for reimmersion into gameplay by a user is provided. When a gap in time between a prior session of gameplay and a current session of gameplay of a user is identified, an intensity adjustment is applied. The intensity adjustment is configured to reduce the level of interactive input required for a user to advance in the video game. By making it easier for a user to advance in the video game, the intensity adjustment gives the user an opportunity to recall how the game is played and how to provide inputs to the controller for different game contexts without becoming frustrated by a lack of success in the game due to a drop in skill level. This makes it more likely that a user will return to games that the user has not played for a long time.

Figure 1:
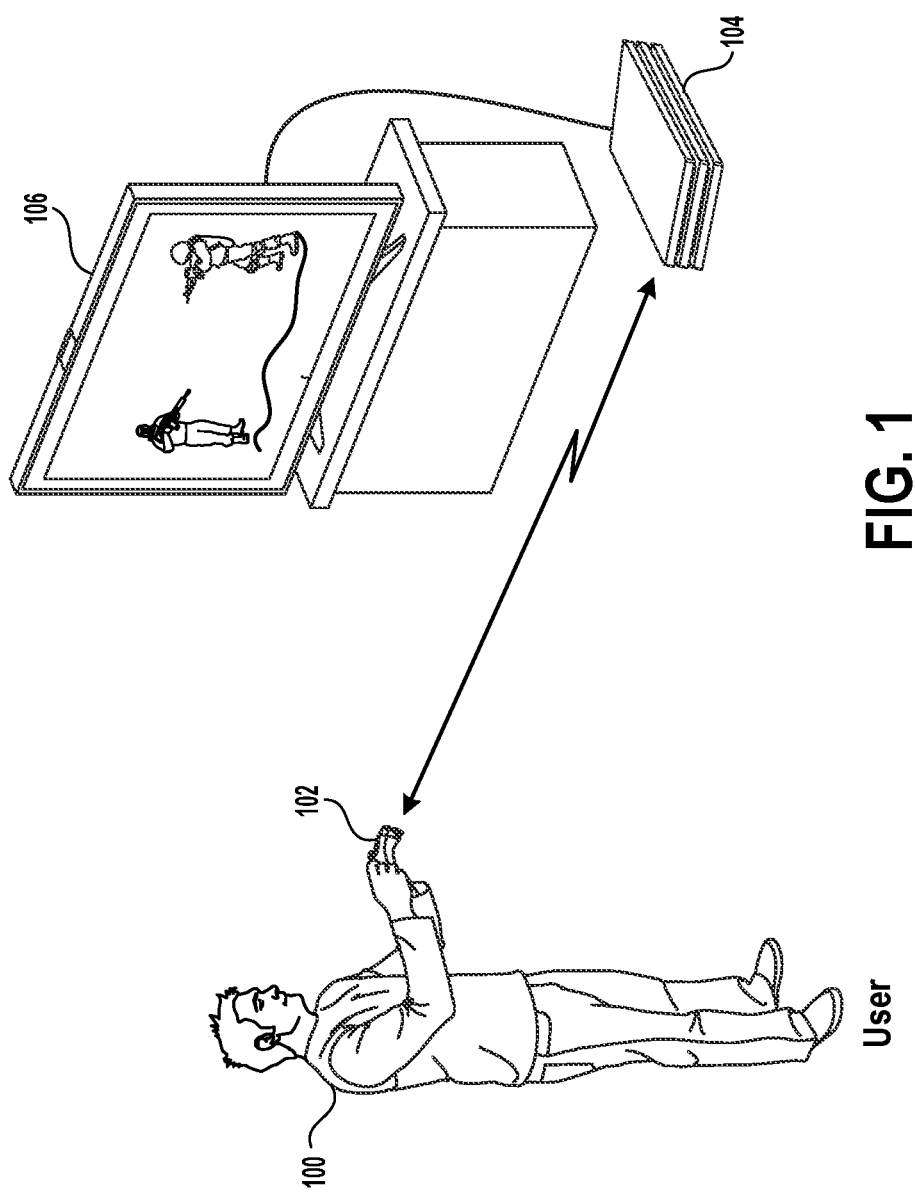
FIG. 1 illustrates a user playing a video game, in accordance with one embodiment.

FIG. 1 illustrates a user playing a video game, in accordance with one embodiment. As shown in FIG. 1, user 100 is using a controller 102 to play a video game. As is well known, the controller 102 includes various input devices including, for example, main input buttons (e.g., square, triangle, X, and circle buttons), directional buttons, trigger buttons, shoulder buttons, and left and right analog sticks. The user 100 uses the input devices of the controller 102 to interact with characters and other objects of the video game. The controller 102 transmits the inputs made by the user 100 to gaming device 104, which can be any suitable computing device having either wired or wireless access to the internet. By way of example, gaming device 104 can be a game console or a personal computer. The controller 102 also can receive feedback signals from the gaming device 104. In one embodiment, the feedback signals are used to generate vibrations in the controller 102 that simulate interacting with real-life objects. Gaming device 104 includes, among other things, a suitable graphics subsystem that outputs pixel data for an image to be displayed on a display 106. The display 106 can be any suitable display device including, for example, a television, a computer monitor, or a head-mounted display (HMD) worn by the user.

Figure 2:
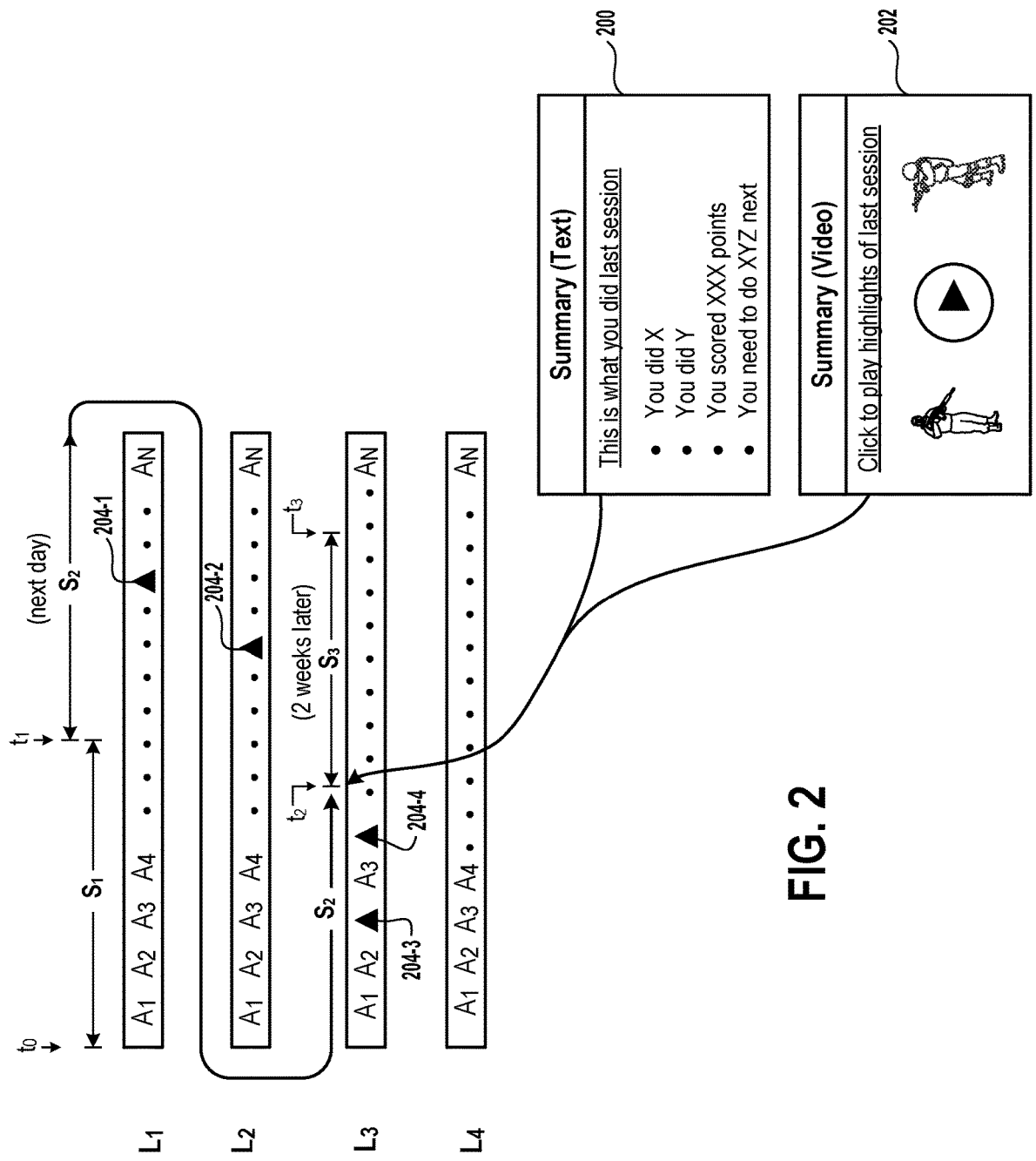
FIG. 2 is a simplified schematic diagram that illustrates a timeline of example sessions of a video game played by a user, in accordance with one embodiment.

FIG. 2 is a simplified schematic diagram that illustrates a timeline of example sessions of a video game played by a user, in accordance with one embodiment. As shown in FIG. 2, the video game includes four levels, $L_1$, $L_2$, $L_3$, and $L_4$, and each of these levels includes a number of actions, $A_1$, $A_2$, $A_3$, $A_4$, ... $A_N$, to be performed by the user. By way of example, the actions to be performed by the user could include shooting a weapon, jumping an object, eliminating a monster, capturing a treasure, etc. At time t0, which corresponds to the start of the video game, the user starts a first gaming session S1 in which the user performs a number of actions in level $L_1$ of the video game. At time t1, the user stops playing the video game and gaming session $S_1$ ends with the user having advanced about halfway through level $L_1$. In one embodiment, gaming session $S_1$ occurs on a Friday and lasts for a period of about 1.2 hours. Over the course of gaming session $S_1$, the user's skill level increases to player skill level $PS_1$ (see FIG. 3) as the user performs more actions and becomes more familiar with the inputs (button presses, button combinations, etc.) needed to perform the actions in the video game.

The user returns to the video game the next day for a second gaming session $S_2$. In the embodiment in which gaming session $S_1$ occurs on a Friday, gaming session $S_2$ occurs on a Saturday. Gaming session $S_2$ starts at time $t_1$, which corresponds to the point in the video game at which gaming session $S_1$ ended. During gaming session $S_2$, the user performs actions in the video game and advances from level $L_1$ to level $L_3$. At time $t_2$, the user stops playing the video game and gaming session $S_2$ ends with the user having advanced to a point just short of halfway through level $L_3$. In one embodiment, gaming session $S_2$ lasts for a period of about 4.0 hours. Over the course of gaming session $S_2$, the user's skill level drops slightly at the start of the session as the user gets reacquainted with the video game but eventually increases to player skill level $PS_2$ (see FIG. 3) as the user becomes immersed in the video game and gets more proficient at making the inputs needed to perform the actions in the video game.

After not playing the video game for two weeks, the user returns to the video game for a third gaming session $S_3$. Gaming session $S_3$ starts at time $t_2$, which corresponds to the point in the video game at which gaming session $S_2$ ended. During gaming session $S_3$, the user struggles to perform actions in level $L_3$ of the video game because the user's familiarity with the video game has fallen off since the user last played two weeks ago. For example, the user might have forgotten the state of gameplay at the point at which prior gaming session $S_2$ ended or might have forgotten some of the controller inputs required to perform game actions. Consequently, the user's player skill level significantly decreases (see FIG. 3) due to the user not playing the video game for two weeks. At time $t_3$, the user stops playing the video game and gaming session $S_3$ ends before the user has completed level $L_3$. This relatively poor performance can cause the user to become frustrated and quit playing the video game.

Figure 3:
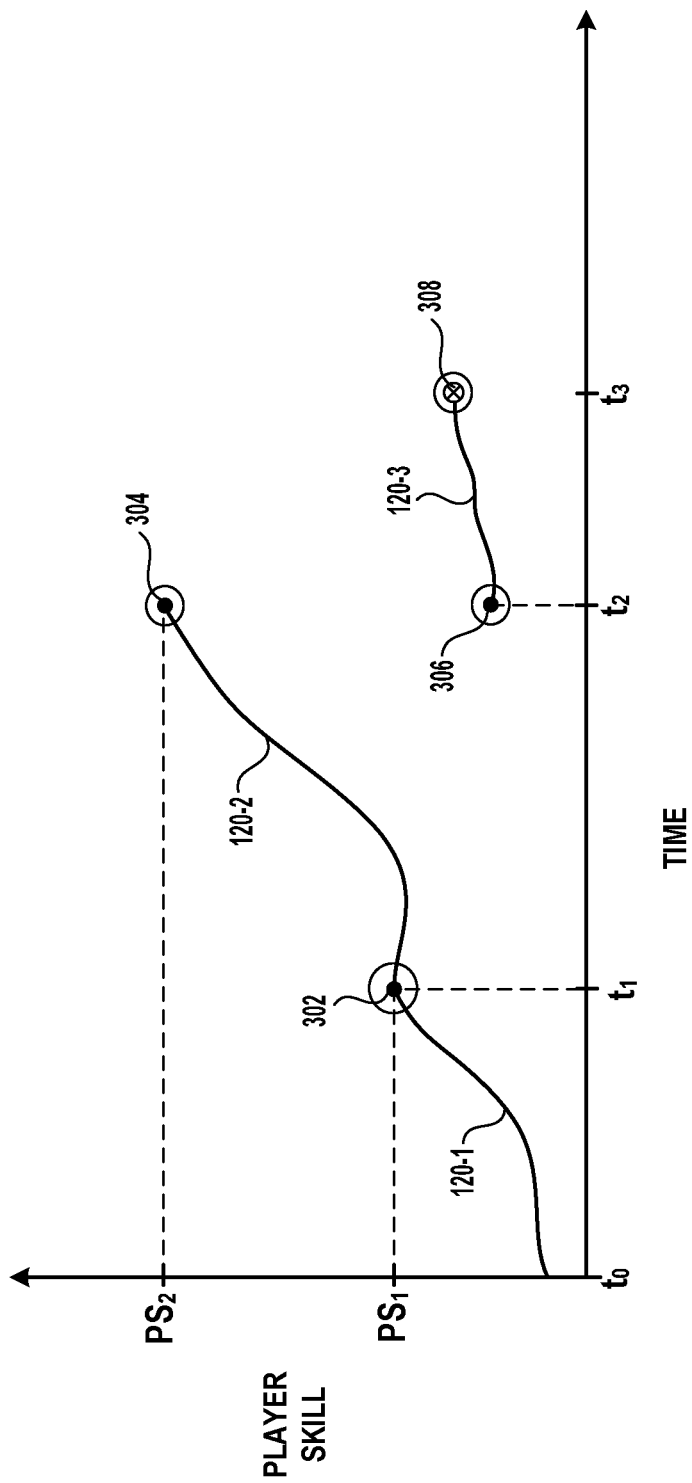
FIG. 3 is a graph showing player skill versus time for a user playing a video game, in accordance with one embodiment.

FIG. 3 is a graph showing player skill versus time for a user playing a video game, in accordance with one embodiment. As shown in FIG. 3, curve 120-1 tracks the user's player skill level as the user plays the video game from time $t_0$ to time $t_1$, which corresponds to gaming session $S_1$ described above with reference to FIG. 2. As indicated by curve 120-1, the user's player skill level increases slowly during the first half of gaming session $S_1$ and increases more rapidly during the second half of gaming session $S_1$ as the user becomes more proficient at playing the video game. At the end of gaming session $S_1$, which is defined by indicator 302, the user has a player skill level of $PS_1$. Curve 120-2 tracks the user's player skill level as the user plays the video game from time $t_1$ to time $t_2$, which corresponds to gaming session $S_2$ described above with reference to FIG. 2. As shown in FIG. 3, curve 120-2 extends from indicator 302, which defines the end of gaming session $S_1$ and the beginning of gaming session $S_2$, to indicator 304, which defines the end of gaming session $S_2$. As indicated by curve 120-2, the user's player skill level falls slightly at the start of gaming session $S_2$ as the user gets reacquainted with the video game and the inputs needed to perform actions in the video game. This slight decline in player skill level occurs because of the relatively short delay between gaming session $S_1$ and gaming session $S_2$. For example, as mentioned above, gaming session $S_1$ occurs on one day, e.g., Friday, and gaming session $S_2$ occurs the next day, e.g., Saturday. Thereafter, the user's player skill level increases as the user becomes immersed in gameplay during the remainder of gaming session $S_2$. At the end of gaming session $S_2$, which is defined by indicator 304, the user has a player skill level of $PS_2$.

Curve 120-3 tracks the user's player skill level as the user plays the video game from time $t_2$ to time $t_3$, which corresponds to gaming session $S_3$ described above with reference to FIG. 2. As shown in FIG. 3, curve 120-3 extends from indicator 306, which defines the start of gaming session $S_3$, to special indicator 308, which defines the end of gaming session $S_3$. As mentioned above in connection with the description of FIG. 2, gaming session $S_3$ occurs two weeks after gaming session $S_2$. As a result of this delay between gaming sessions, the user's player skill level drops off significantly because the user's knowledge of the video game has weakened since last playing two weeks ago. In particular, the user might have forgotten the state of gameplay at the point at which prior gaming session $S_2$ ended or might have forgotten some of the controller inputs required to perform game actions in the video game. As indicated by curve 120-3, the user's player skill level at the start of gaming session $S_3$ (see indicator 306) is below the user's player skill level of $PS1$ at the end of gaming session $S1$. With this diminished player skill level, the user struggles to advance in the video game during gaming session $S_3$, which involves relatively difficult gameplay in level 3 of the video game. As a result, the user gets frustrated and stops playing the video game at time $t_3$, as indicated by special indicator 308. The "x" symbol within special indicator 308 indicates that it is likely that the user will quit playing the video game because of the user's diminished player skill level.

To help the user get reacquainted with the video game after not playing for a while, in one embodiment, the user is provided with a summary of the gameplay from the user's last gaming session. Referring back to FIG. 2, at time $t_2$, which corresponds to the point in the video game at which gaming session S3 starts, the user is provided with a summary of the gameplay from gaming session S2. This summary can be either a written (text) summary and/or a video summary. In one embodiment, a written (text) summary is displayed to the user using interface 200. By way of example, interface 200 can list significant actions that the user performed in the user's last gaming session (e.g., "You did X," "You did Y," etc.) and the user's performance in the last gaming session (e.g., "You scored XXX points). Interface 200 also can provide the user with a preview of what actions the user will need to perform at the start of gaming session S3 (e.g., "You need to perform XYZ next"). In this manner, the user's recollection of the video game will be refreshed and the user will understand the context of the video game when gaming session $S_3$ starts. This assistance will give the user a better chance of performing well after a delay in playing the video game and reduce the likelihood that the user will get frustrated and quit playing the video game.

In another embodiment, a video summary is displayed to the user using interface 202. Interface 202 can include a play button (or other suitable graphical user interface) that the user can click to play highlights and key events of the last gaming session. As shown in FIG. 2, gaming session S2 includes highlights and key events 204-1, 201-2, 204-3, and 204-4, which are designated by the symbol "▲." These highlights and key events can include, by way of example, actions in which the user scored points, achieved a goal, or performed a difficult move well. Upon watching the highlights included in the video summary, the user's recollection of the video game will be refreshed and the user will understand the context of the video game when gaming session $S_3$ starts. Consequently, the user will be in a better position to perform well when resuming gameplay. This assistance will help reduce the drop in player skill level associated with a delay in playing the video game and thereby reduce the likelihood that the user will get frustrated and quit playing the video game.

Figure 4A:
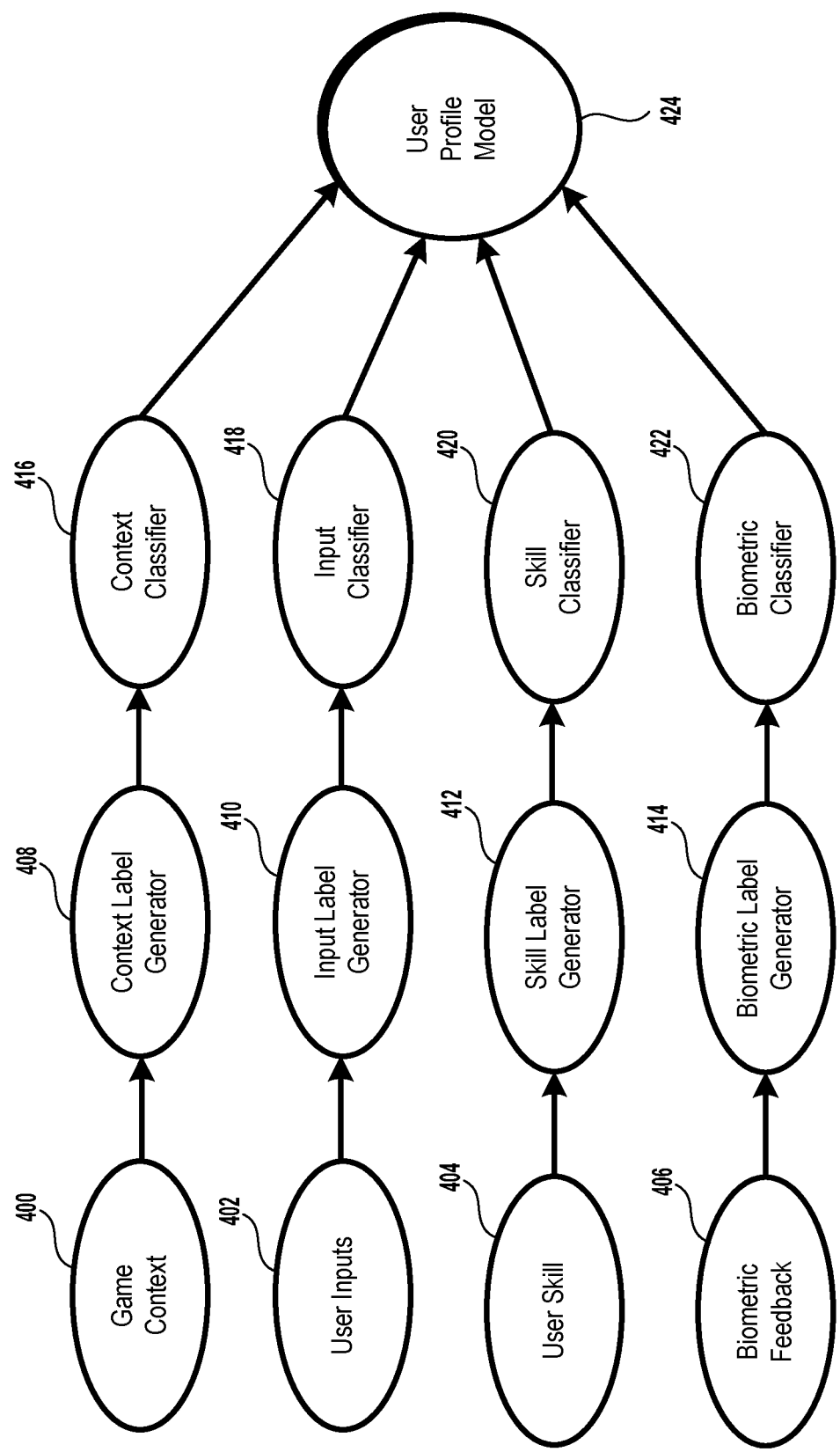
FIG. 4A is a diagram that illustrates a machine learning training process to generate a user profile model using many sessions of gameplay, in accordance with one embodiment.

FIG. 4A is a diagram that illustrates a machine learning training process to generate a user profile model using many sessions of gameplay, in accordance with one embodiment. In this machine learning training process, the game engine captures raw data during the user's gaming sessions. The captured raw data includes data regarding a number of aspects of gameplay. As shown in FIG. 4A, the captured raw data includes data in the following categories: game context 400; user inputs 402; user skill 404; and biometric feedback 406. The data relating to game context 400 includes, by way of example, data relating to where the user is in the video game and data relating to what is happening in the video game. The data relating to where the user is in the video game can include data regarding the points the user has scored and the game level achieved by the user. The data relating to what is happening in the game can include data regarding the specific action taking place in the video game, e.g., a fight scene, a chase scene, etc. The data relating to user inputs 402 includes, by way of example, data regarding the user's button pushes, analog stick movements, and trigger button pushes as well as data from the inertial sensors in the controller, e.g., controller 102 shown in FIG. 1. The data relating to user skill 404 includes data regarding the level the user has achieved in the video game, the awards and/or trophies the user has won, and the number of followers the user has regarding the video game. The data regarding biometric feedback 406 includes, by way of example, sensor data, e.g., heart rate sensor data, audio data, and movement data, e.g., muscle movement data.

To facilitate identification of the data content, the captured raw data is labeled. In particular, context label generator 408 labels the data regarding game context 400. Input label generator 410 labels the data regarding user inputs 402. Skill label generator labels the data regarding user skill 404. Biometric label generator 414 labels the data regarding biometric feedback 406. The labels generated by the various label generators are then classified into identifiable classes that can be used to generate relationships, as will be described in more detail below. In particular, context classifier 416 classifies the context labels generated by context label generator 408. Input classifier 418 classifies the input labels generated by input label generator 410. Skill classifier 420 classifies the skill labels generated by skill label generator 412. Biometric classifier 422 classifies the biometric labels generated by biometric label generator 414.

User profile model 424 is a neural network that uses the various labels and classifications to create relationships that form the model. The user profile model 424 is used to predict the user's tendencies and actions in one or more video games, as well as to assess the user's gameplay abilities, successes, and general skills in relation to specific game context and game levels. The user profile model 424 uses machine learning processing to adjust the model over the course of time. Thus, the more gaming sessions included in the model for a user, the better the model can characterize the user. In one embodiment, the user profile model is used to predict a loss in skill by the user based on the gap in time between the prior session and the current session, as will be explained in more detail below.

Generally speaking, the longer the delay between gaming sessions for a user, the bigger the drop in skill and the steeper the falloff in remembrance of the game will be for the user. For longer delays, e.g., one month or longer, reviewing the in-game summary of what happened in the user's last gaming session might not be sufficient to bring the user's knowledge of the video game back up to the level needed to play the video game at the point at which the user's last gaming session ended, e.g., level 3, level 4, etc. In these situations, the user will require additional assistance to resume playing the video game.

In one embodiment, at the restart of gaming by the user, the gaming system implements a reimmersion process in which the intensity of the video game is reduced to provide the user with an opportunity to get reacquainted with the video game while playing at a lower intensity level. In one embodiment, the lower intensity level is configured to enable a user to advance in the video game with a lower level of skill. As the user becomes more familiar with the video game, the gaming system gradually increases the intensity level of the video game. Once the reimmersion process is complete and the user is fully immersed in the gameplay, the gaming system returns the intensity level of the video game to full intensity. The shift to full intensity can be gradual or can occur at specific game scene transitions to avoid obvious changes in gameplay.

In one embodiment, the reimmersion process is implemented when the gap in time between the prior session and the current session is about one month or longer. The gap in time between the prior session and the current session can be correlated to a predicted loss in skill by the user. Depending on the predicted loss in skill by the user, in one embodiment, the intensity adjustment for the gameplay of the current session is configured to reduce the level of interactive input, e.g., button presses or combinations of button presses, required to complete actions to advance in the video game. In one embodiment, each of the actions in the video game is associated with required interactive input by the user. By reducing the level of interactive input required to complete actions in the game, the intensity adjustment enables a user to advance in the game with a lower level of skill. The lower level of skill required to advance can be varied based on the gap in time between the prior session and the current session, with a larger gap in time influencing the degree to which the skill level is lowered to arrive at the particular lower skill level. It should be understood that a gap of one month or longer or shorter, or any other mentioned time span for the gap can be preconfigured by the system and/or game engine of a specific game. In some cases, the gap can be user configured as a setting, e.g., by the user as part of a setting. And in still other embodiments, the gap can be configured automatically by a program, e.g., using machine learning for a specific user or type of user.

In another embodiment, game reimmersion assistance is offered to the user on an optional basis. By way of example, if the gaming system detects that the user has not played the game for a certain length of time, e.g., one month or longer, the user can be given the option to receive game reimmersion assistance. In one embodiment, the gaming system prompts the user with a notification, via a suitable user interface (input button, selectable icon, user settings, game settings, game options, a check box, a voice command, etc.), to turn on the game reimmersion assistance feature. In one embodiment, the notification is provided by a user interface presented in the display user for gameplay of the game, and the user input is selectable using either a button press of the controller used for gameplay or voice input.

In another configuration, the user may decide that the game is too difficult or does not remember how certain inputs are made and/or maneuvers should be made to strategically achieve success for an input, an action, a game sequence, or interactive input. At any such point, the user may provide input to command the system and/or game engine to activate game reimmersion. If the user begins to feel comfortable with the game and/or the user's skill level, the user may manually deactivate game reimmersion. Alternatively, even if the user manually activates game reimmersion, the system and/or game engine can gradually reduce and then terminate game reimmersion for the user, e.g., as skill level increases and/or the skill level reaches a level previously attained by the user.

In yet another embodiment, in the event that the user profile model determines that the user's skill level may have decreased, the gaming system can prompt the user to turn on the game reimmersion assistance feature. Accordingly, it should be understood that activation of game reimmersion may either be activated manually at the user's request, in response to a prompt by the system and/or game engine, or activated automatically when the gap exceeds some predetermined amount of time.

In cases where the gap in time is significantly longer, e.g., twelve months or longer, the intensity adjustment can be maximized to provide the user with as much assistance as possible. In one embodiment, the intensity adjustment is maximized by reducing the number of inputs via the controller required to advance in the game to the lowest level possible. By way of example, where the user usually has to input three "X" button presses and a circle button press, followed by moving an analog stick up and to the right to complete an action and advance in the video game, the maximum intensity adjustment can be preconfigured to allow the user to complete the action and advance in the game with a single press of the "X" button.

Figure 4B:
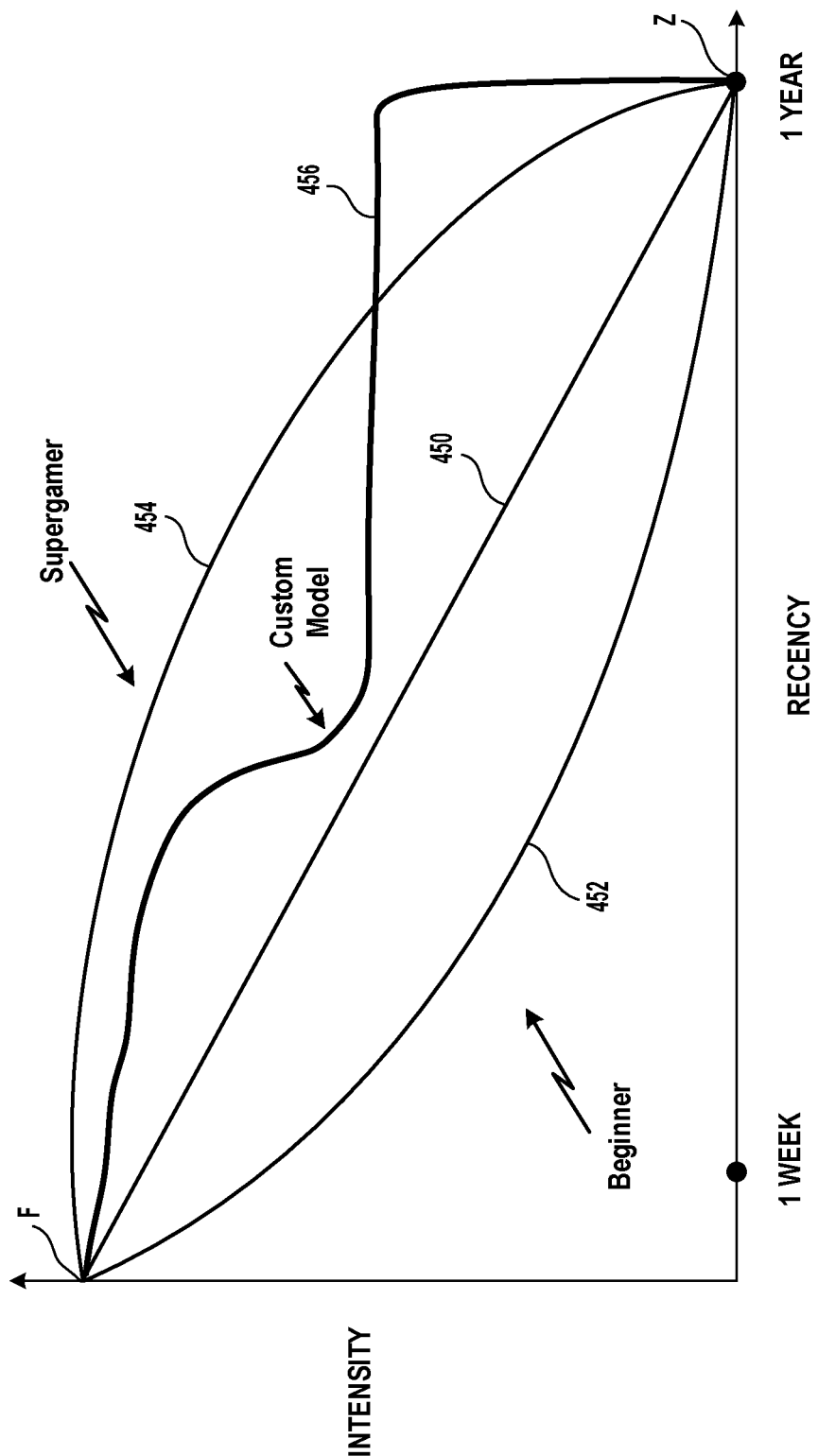
FIG. 4B is a graph showing video game intensity versus recency for a user playing a video game, in accordance with one embodiment.

FIG. 4B is a graph showing video game intensity versus recency for a user playing a video game, in accordance with one embodiment. As shown in FIG. 4B, curve 450 is a standard curve that can be used to determine the intensity level to be used for an average user of the video game. Curve 452 is a curve that can be used to determine the intensity level to be used for a beginning user of the video game. Curve 454 is a curve that can be used to determine the intensity level to be used for a supergamer. Curve 456 is a curve that can be used to determine the intensity level for a user based on a characterization of the user generated by a custom model, e.g., user profile model 424 described above with reference to FIG. 4A.

As shown in FIG. 4B, each of curves 450, 452, 454, and 456 intersects the intensity axis at point F, which indicates full intensity for the video game. Thus, in each scenario, e.g., standard user, beginning user, supergamer, and custom model user, the video game will be at full intensity when the user first plays the video game. Thereafter, when a user returns to the video game after a delay in playing the video game, the applicable curve will be used to determine the intensity level for the user based on the user's recency, e.g., one-week delay, one-month delay, two-month delay, one-year delay, etc. As shown in FIG. 4B, each of curves 450, 452, 454, and 456 intersects the recency axis at point Z, which designates a delay in playing the video game of one year (or longer). After a delay of at least one year, the user is assumed to have lost essentially all knowledge of the video game and the gaming system will use the lowest intensity level available to implement the reimmersion process for the user.

The standard curve 450 for an average user is a straight line that extends from point F in a downward direction to point Z. Curve 452 for a beginning user defines an arc between points F and Z that is situated below the standard curve 450. This reflects that a beginning user will lose knowledge of the video game more quickly than an average user. As such, for a given period of delay, e.g., one week, the gaming system will use a lower intensity level to implement the reimmersion process for the beginning user than the average user. Curve 454 for a supergamer defines an arc between points F and Z that is situated above the standard curve 450. This reflects that a supergamer, namely, a user with a superior player skill level and/or a user with many successes, e.g., awards and trophies, will retain knowledge of the video game longer than an average user. As such, for a given period of delay, e.g., one week, the gaming system will use a higher intensity level to implement the reimmersion process for the supergamer than the average user.

Curve 456 defines a curve based on a characterization of the user generated by a custom model, e.g., user profile model 424 described above with reference to FIG. 4A. As shown in FIG. 4B, curve 456 gradually falls off as the user's delay in playing the video game approaches six months, but then plateaus and remains at a substantially constant level until the user's delay in playing the video game reaches roughly one year. At that point, curve 456 dramatically falls off and intersects with point Z. As mentioned above, the custom model uses machine learning to adjust the model over the course of time. As such, curve 456 can change as the characterization of the user generated by the custom model changes over time.

Figure 5A:
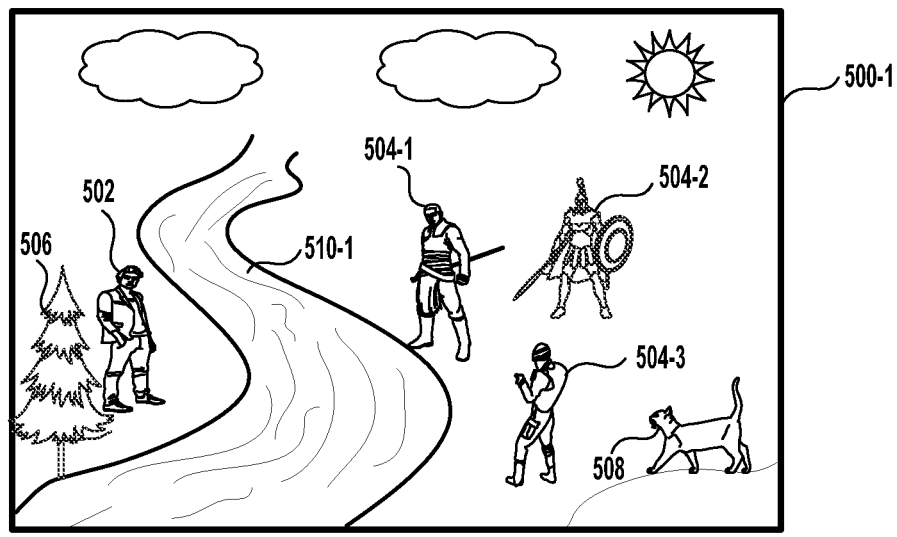
FIGS. 5A and 5B show example scenes from a video game that illustrate a process for reducing the intensity of a video game, in accordance with one embodiment.
Figure 5B:
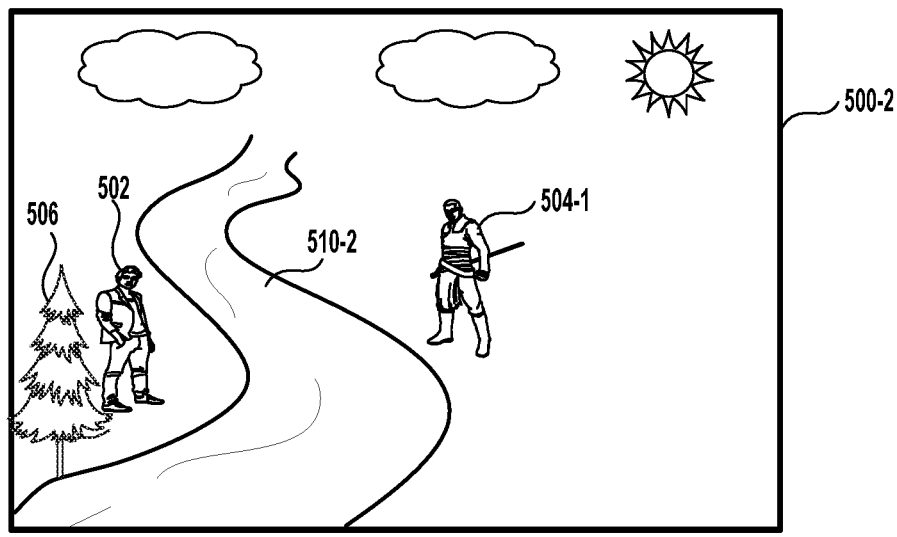

FIGS. 5A and 5B show example scenes from a video game that illustrate a process for reducing the intensity of a video game, in accordance with one embodiment. FIG. 5A shows scene 500-1 of a video game which includes, among other things, the user's avatar 502, three bad guys 504-1, 504-2, and 504-2, and a mountain lion 508. As shown in FIG. 5A, the user's avatar 502 is standing next to a tree 506 on one side of river 510-1, which is a rapidly flowing river with dangerous rapids. The three bad guys 504-1, 504-2, and 504-3, who are in pursuit of the user's avatar 502, are situated on the opposite side of river 510-1 along with mountain lion 508. To advance in the video game as shown in scene 500-1, the user must complete game actions that enable the user's avatar 502 to cross the dangerous river 510-1 and get past not only the three bad guys 504-1, 504-2, and 504-3, but also the mountain lion 508. A user who has not played the video game for a while might not be capable of performing the game moves required to cross the dangerous river and get past the three bad guys and the mountain lion. Thus, it is unlikely that such a user will be able to advance in the video game beyond the scenario shown in scene 500-1 of the video game. This inability to advance in the video game will likely cause the user to become frustrated and quit playing the video game.

To help the user advance in the video game beyond scene 500-1, the gaming system can implement a reimmersion process in which the intensity of scene 500-1 is reduced to give the user an opportunity to regain familiarity with the video game and the inputs required to perform actions in the video game. By way of example, the intensity of the video game can be reduced by reducing the number of game assets, reducing the size and/or speed of game assets, and/or reducing the rate at which game assets are reintroduced into the game. As used herein, the term "game asset" and the term "asset" refer to interactive content in the video game. By way of example, the interactive content can include other characters in the video game (e.g., bad guys the user needs to battle against), artificial intelligence (AI) objects generated in the game, the environment in a scene (e.g., clouds in the sky, trees, a river, etc.), and the like.

FIG. 5B shows a scene 500-2 of a video game in which the intensity of the video game has been reduced to make it easier for the user to play the video game successfully. As shown in FIG. 5B, scene 500-2 corresponds to scene 500-1 shown in FIG. 5A after certain game assets shown in scene 500-1 have been removed and the speed of one of the game assets shown in scene 500-1 has been reduced. In particular, bad guys 504-2 and 504-2 and mountain lion 508 shown in scene 500-1 have been removed. In addition, the speed of river 510-1 shown in scene 500-1 has been reduced. In particular, river 510-2 shown in scene 500-2 is a gently flowing river, whereas river 510-1 shown in scene 500-1 is a rapidly flowing river with dangerous rapids. To advance in the video game as shown in scene 500-2, the user needs to complete game actions that enable the user's avatar 502 to cross the gentle river 510-2 and get past bad guy 504-1. This represents a much easier challenge than the one presented in scene 500-1 and thereby gives the user an opportunity to get reimmersed in gameplay without being overwhelmed. As the user regains familiarity with the inputs required to perform actions in the video game, the gaming system can gradually increase the intensity of the video game by, for example, reintroducing assets into the video game and increasing the speed of certain assets in the video game.

In one embodiment, the gaming system implements the reimmersion process automatically when the gaming system detects that the user is returning to a specific video game after not playing for a period of time sufficient to have weakened the user's knowledge of that game, e.g., a gap of weeks or months since the user's last session. As the user plays the video game at a reduced intensity level, the gaming system monitor's the user's success and automatically returns the user to playing at the full intensity level when the user's success warrants such action. In one embodiment, the gaming system gradually returns the user to playing at the full intensity level. In another embodiment, the gaming system shifts the user back to playing at the full intensity level at scene transitions selected to avoid obvious changes in gameplay of the video game.

In one embodiment, the success of the interactive input of the user is monitored during the current gaming session and this success is used to gear the removal of the intensity adjustment being applied to the video game. When the user achieves more success, the gearing increases the rate at which the intensity adjustment is gradually removed from the game. When the user achieves less success, the gearing decreases the rate at which the intensity adjustment is gradually removed from the game. In one embodiment, the success of the interactive input of the user is normalized to a median of the success achieved by a predetermined number of other users in the game. The predetermined number of other users can be varied but should be large enough to ensure that the resulting median of success achieved by the other users is representative of the overall population of users in the game.

Figure 6:
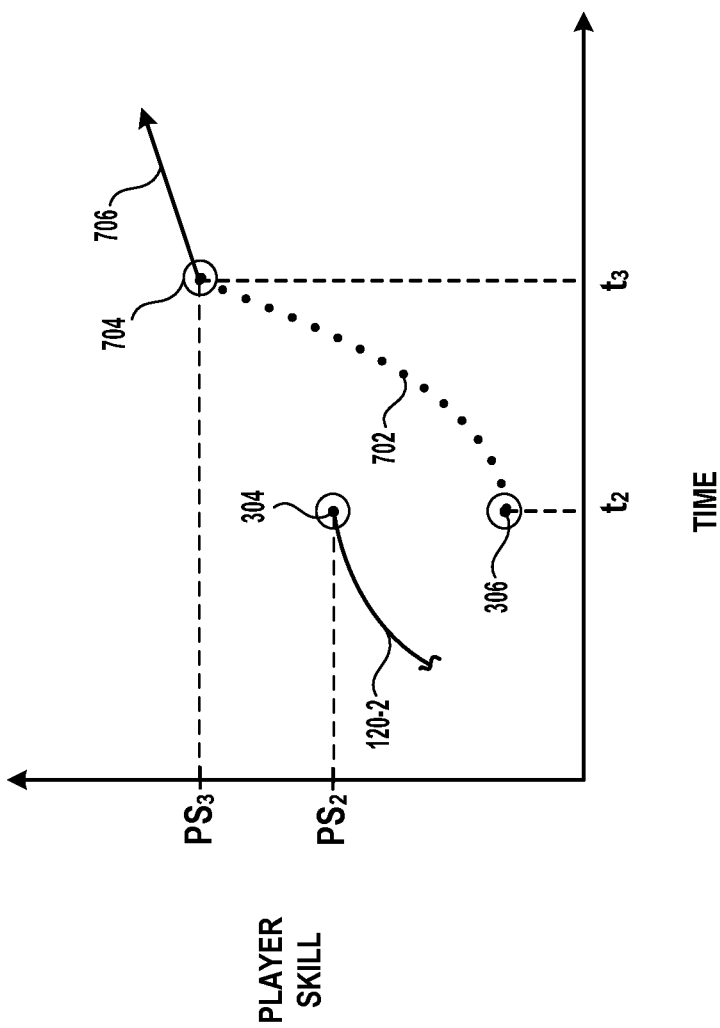
FIG. 6 is a graph showing player skill versus time for a user playing a video game, in accordance with one embodiment.

FIG. 6 is a graph showing player skill versus time for a user playing a video game, in accordance with one embodiment. As shown in FIG. 6, curve 702 tracks the user's player skill level as the user plays the video game at a reduced intensity level from time $t_2$ to time $t_3$, which corresponds to gaming session $S_3$ described above with reference to FIG. 2. As discussed above with reference to FIG. 3, the user's player skill level at the start of gaming session $S_3$ is significantly reduced (see indicator 306) because the user has not played the game in a while. As the user plays the video game at the reduced intensity level, the user's player skill level rises (see curve 702) as the user gets reimmersed in the video game and becomes more proficient at executing the inputs needed to complete actions in the video game. At the end of gaming session $S_3$ played at the reduced intensity level, which is defined by indicator 704, the user has a player skill level of $PS_3$ and is in position to further increase that player skill level during the user's next gaming session, as indicated by the curve 706. In contrast, in gaming session $S_3$ played at full intensity (see FIG. 3), the user struggled to advance in the video game, got frustrated by the lack of success, and quit playing the game.

In one embodiment, based on the predicted loss in skill by the user, the reimmersion process includes an intensity adjustment that both reduces the level of interactive input by the user (e.g., inputs via a controller) required to advance in the game and also reduces an amount of interactive content displayed for scenes in the game (e.g., characters are removed from a scene as shown in FIG. 5B). This type of intensity adjustment can be helpful in cases where there is a large gap in time between a user's prior session and the user's current session and the associated loss of skill by the user is significant.

In one embodiment, the removal of the intensity adjustment is associated with the reimmersion of the user into the video game. In this example, the user is considered to have achieved reimmersion into the video game when the interactive input of the user during the current session achieves a level of success that meets or exceeds the level of success achieved by the user in the prior session. Once a user achieves reimmersion into the video game during the current session, the process of gradually removing the intensity adjustment begins and the user is eventually returned to playing the game at the full intensity level.

In one embodiment, the gaming system performs an in-game calibration for a successive gaming session to help the user immerse in gameplay. The in-game calibration can include providing the user with special test routines or test inputs to assist the user in recalling how the video game is played and how to provide inputs to the controller for different game contexts. Once the calibration mode is complete, the gaming system can automatically put the user back into live game mode.

Figure 7:
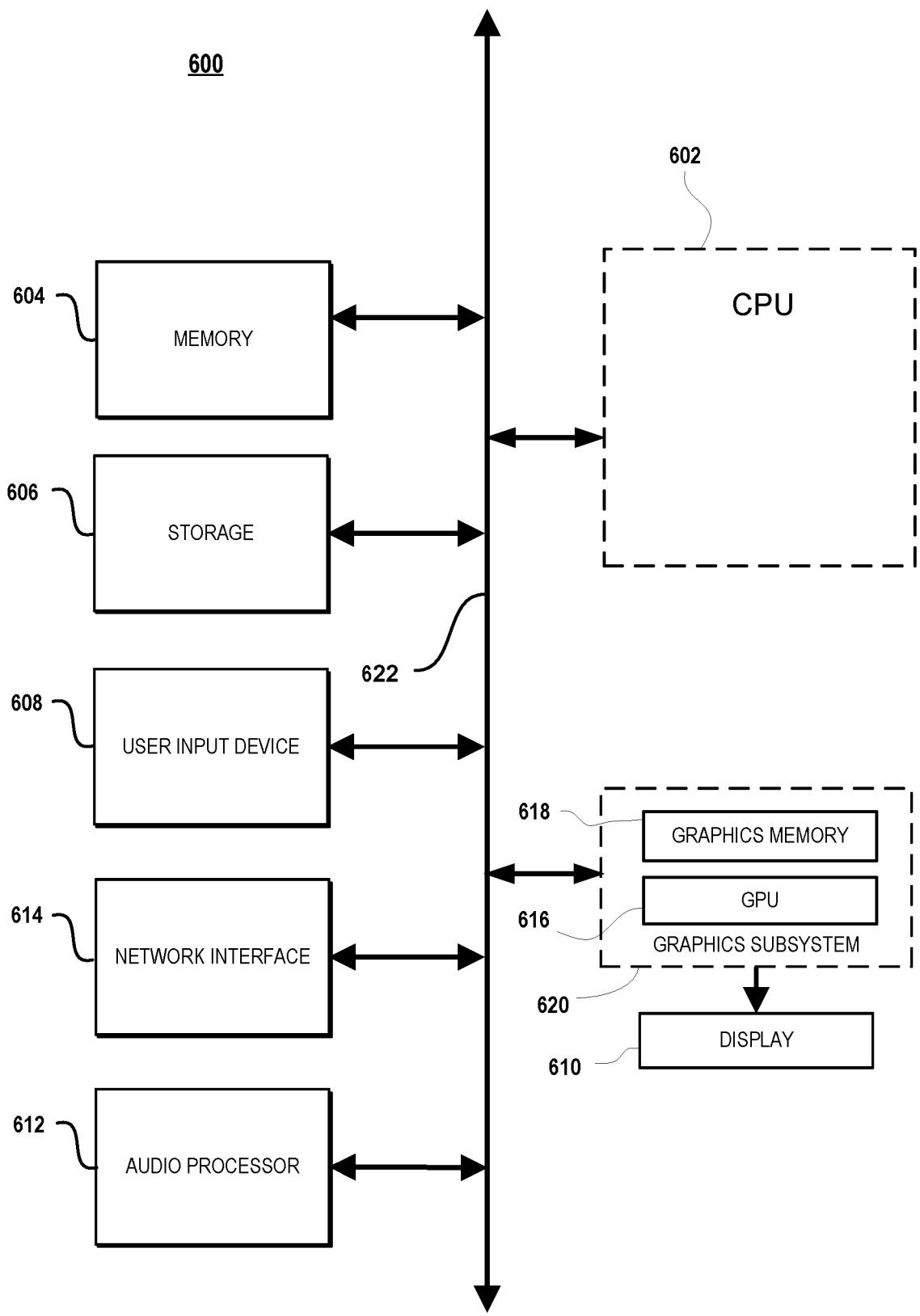
FIG. 7 is a schematic diagram of a computing system and components, which may be used in accordance with one or more embodiments of the disclosure.

FIG. 7 illustrates components of an example device 600 that can be used to perform aspects of the various embodiments of the present disclosure. This block diagram illustrates a device 600 that can incorporate or can be a personal computer, video game console, personal digital assistant, a server or other digital device, suitable for practicing an embodiment of the disclosure. Device 600 includes a central processing unit (CPU) 602 for running software applications and optionally an operating system. CPU 602 may be comprised of one or more homogeneous or heterogeneous processing cores. For example, CPU 602 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 600 may be a localized to a player playing a game segment (e.g., game console), or remote from the player (e.g., back-end server processor), or one of many servers using virtualization in a game cloud system for remote streaming of gameplay to clients.

Memory 604 stores applications and data for use by the CPU 602. Storage 606 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 608 communicate user inputs from one or more users to device 600, examples of which may include keyboards, mice, joysticks, touch pads, touch screens, still or video recorders/cameras, tracking devices for recognizing gestures, and/or microphones. Network interface 614 allows device 600 to communicate with other computer systems via an electronic communications network, and may include wired or wireless communication over local area networks and wide area networks such as the internet. An audio processor 612 is adapted to generate analog or digital audio output from instructions and/or data provided by the CPU 602, memory 604, and/or storage 606. The components of device 600, including CPU 602, memory 604, data storage 606, user input devices 608, network interface 610, and audio processor 612 are connected via one or more data buses 622.

A graphics subsystem 620 is further connected with data bus 622 and the components of the device 600. The graphics subsystem 620 includes a graphics processing unit (GPU) 616 and graphics memory 618. Graphics memory 618 includes a display memory (e.g., a frame buffer) used for storing pixel data for each pixel of an output image. Graphics memory 618 can be integrated in the same device as GPU 608, connected as a separate device with GPU 616, and/or implemented within memory 604. Pixel data can be provided to graphics memory 618 directly from the CPU 602. Alternatively, CPU 602 provides the GPU 616 with data and/or instructions defining the desired output images, from which the GPU 616 generates the pixel data of one or more output images. The data and/or instructions defining the desired output images can be stored in memory 604 and/or graphics memory 618. In an embodiment, the GPU 616 includes 3D rendering capabilities for generating pixel data for output images from instructions and data defining the geometry, lighting, shading, texturing, motion, and/or camera parameters for a scene. The GPU 616 can further include one or more programmable execution units capable of executing shader programs.

The graphics subsystem 620 periodically outputs pixel data for an image from graphics memory 618 to be displayed on display device 610. Display device 610 can be any device capable of displaying visual information in response to a signal from the device 600, including CRT, LCD, plasma, and OLED displays. Device 600 can provide the display device 610 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the internet, based on how the internet is depicted in computer network diagrams and is an abstraction for the complex infrastructure it conceals.

A game server may be used to perform the operations of the durational information platform for video game players, in some embodiments. Most video games played over the internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each compute node is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as HTML, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

In one embodiment, the various technical examples can be implemented using a virtual environment via a head-mounted display (HMD). An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space or metaverse. For example, the user may see a three-dimensional (3D) view of the virtual space when facing in a given direction, and when the user turns to a side and thereby turns the HMD likewise, then the view to that side in the virtual space is rendered on the HMD. An HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on an HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although method operations may be described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the telemetry and game state data are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation may be produced by an emulator. In either case, if the video game is represented as a simulation, that simulation is capable of being executed to render interactive content that can be interactively streamed, executed, and/or controlled by user input.

Accordingly, the disclosure of the example embodiments is intended to be illustrative, but not limiting, of the scope of the disclosures, as set forth in the following claims. Although example embodiments of the disclosures have been described in some detail for purposes of clarity of understanding, it will be apparent that certain changes and modifications can be practiced within the scope and equivalents of the following claims. In the following claims, elements and/or steps do not imply any particular order of operation, unless explicitly stated in the claims or implicitly required by the disclosure.

What is claimed is:

1. A method for adjusting game intensity of a game for reimmersion into gameplay by a user, comprising:
   identifying a gap in time between a prior session of gameplay and a current session of gameplay of the user;
   applying an intensity adjustment for the gameplay of the current session, the intensity adjustment being configured to reduce a level of interactive input of the user required to advance in the game;
   monitoring a level of success of the interactive input of the user during the current session, the level of success of the interactive input of the user being determined by a level of advancement in the game achieved by the user; and
   removing the applied intensity adjustment gradually as the level of success of the interactive input of the user during the current session approaches a level of success of the interactive input of the user achieved in the prior session, the level of success of the interactive input of the user during the current session reflecting a first level of advancement in the game and the level of success of the interactive input of the user in the prior session reflecting a second level of advancement in the game, the second level of advancement in the game representing more advancement in the game than the first level of advancement in the game.

2. The method of claim 1, wherein the gap in time between the prior session and the current session is correlated to a predicted loss in skill by the user, and the reduction in the level of interactive input reduces a number of inputs via a controller to advance in the game.

3. The method of claim 2, wherein when the gap in time is longer than one month the intensity adjustment is applied, and when the gap in time is greater than twelve months the intensity adjustment is maximized.

4. The method of claim 2, wherein the predicted loss in skill is based on machine learning processing that produces a user profile model, the user profile model is used for the predictive loss in skill of the user over the gap in time.

5. The method of claim 1, wherein the monitoring of the level of success of the interactive input of the user during the current session is used for gearing the removal of the applied intensity adjustment, wherein the gearing increases a rate at which the intensity adjustment is gradually removed when the user achieves more success and the gearing decreases the rate at which the intensity adjustment is gradually removed when the user achieves less success, wherein success is normalized to a median of success achieved by a predetermined number of other users in the game.

6. The method of claim 1, wherein the monitoring of the level of success of the interactive input of the user during the current session is used for gearing the removal of the applied intensity adjustment, wherein the gearing is a rate at which the intensity adjustment is gradually removed until the level of success of the interactive input of the user during the current session reaches the level of success of the interactive input of the user achieved in the prior session.

7. The method of claim 1, wherein the applying of the intensity adjustment for the gameplay of the current session is configured to enable advancement in the game by a user with a lower skill level, wherein the lower skill level is correlated to the gap in time, and wherein a larger gap in time influences a degree to which a skill level is lowered to arrive at the lower skill level at which advancement is in the game is enabled.

8. The method of claim 1, further comprising,
generating a summary of the prior session, the summary assisting the user to understand a context of the game when resuming gameplay in the current session.

9. The method of claim 8, wherein the summary is one of a written summary providing a text description of events related to the prior session or a video summary showing highlights and key events that occurred in the prior session.

10. The method of claim 1, wherein the intensity adjustment for the gameplay of the current session additionally reduces an amount of interactive content displayed for scenes in the game, wherein the interactive content is game assets displayed in the scenes in the game.

11. The method of claim 1, wherein the gap in time between the prior session and the current session is correlated to a predicted loss in skill by the user using a user profile model that characterizes skills of the user.

12. The method of claim 11, wherein for the predicted loss in skill by the user, the applied intensity adjustment both reduces the level of interactive input by the user required to advance in the game and reduces an amount of interactive content displayed for scenes in the game.

13. The method of claim 12, wherein advancing in the game includes completing actions in the game, and wherein each of the actions is associated with required interactive input by the user.

14. The method of claim 13, wherein the required interactive input by the user includes inputs via a controller, the inputs via the controller including button presses or combinations of button presses.

15. The method of claim 1, wherein removal of the applied intensity adjustment is associated with a reimmersion of the user into the game, and wherein the reimmersion of the user into the game corresponds to the interactive input of the user during the current session achieving a level of success that meets or exceeds the level of success of the interactive input of the user achieved in the prior session.

16. A non-transitory computer readable medium containing program instructions for adjusting game intensity of a game for reimmersion into gameplay by a user, wherein execution of the program instructions by one or more processors of a computer system causes the one or more processors to carry out the operations of:
identifying a gap in time between a prior session of gameplay and a current session of gameplay of the user;
applying an intensity adjustment for the gameplay of the current session, the intensity adjustment being configured to reduce a level of interactive input of the user required to advance in the game;
monitoring a level of success of the interactive input of the user during the current session, the level of success of the interactive input of the user being determined by a level of advancement in the game achieved by the user; and
removing the applied intensity adjustment gradually as the level of success of the interactive input of the user during the current session approaches a level of success of the interactive input of the user achieved in the prior session, the level of success of the interactive input of the user during the current session reflecting a first level of advancement in the game and the level of success of the interactive input of the user in the prior session reflecting a second level of advancement in the game, the second level of advancement in the game representing more advancement in the game than the first level of advancement in the game.

17. A method for adjusting game intensity of a game for reimmersion into gameplay by a user, comprising:
identifying a gap in time between a prior session of gameplay and a current session of gameplay of the user;
applying an intensity adjustment for the gameplay of the current session responsive to the user accepting an option for reimmersion assistance, the intensity adjustment being configured to reduce a level of interactive input of the user required to advance in the game;
monitoring a level of success of the interactive input of the user during the current session, the level of success of the interactive input of the user being determined by a level of advancement in the game achieved by the user; and
removing the applied intensity adjustment gradually as the level of success of the interactive input of the user during the current session approaches a level of success of the interactive input of the user achieved in the prior session, the level of success of the interactive input of the user during the current session reflecting a first level of advancement in the game and the level of success of the interactive input of the user in the prior session reflecting a second level of advancement in the game, the second level of advancement in the game representing more advancement in the game than the first level of advancement in the game.

18. The method of claim 17, further comprising,
sending the option for reimmersion assistance to the user in a notification, the notification providing an input that enables acceptance of the option by the user for gameplay of the game.

19. The method of claim 18, wherein the notification is provided by a user interface presented in a display used for gameplay of the game, and the input being selectable using one of a button press of a controller used for gameplay or voice input.

* * * * *